United States Patent Office 3,062,761
Patented Nov. 6, 1962

3,062,761
RUBBERY POLYMER OF A CONJUGATED DIENE CONTAINING A NOVOLAC RESIN AS AN ANTIOXIDANT
Ronald B. Spacht, Kent, Ohio, assignor to The Goodyear Tire & Rubber Company, Akron, Ohio, a corporation of Ohio
No Drawing. Filed Sept. 30, 1957, Ser. No. 686,835
4 Claims. (Cl. 260—3)

This invention relates to the preservation of oxidizable compositions such as rubbers, gasolines, oils, etc., and, more particularly, to the provision and use of a new class of alkylated high-boiling phenols which are useful as age resistors for the various oxidizable compositions.

Unsaturated materials such as rubbers and gasoline are subject to deterioration from many sources, such as sunlight, ozone, atmospheric oxygen, the presence of heavy metals, etc. Both cured and uncured natural and synthetic elastomers are subject to such deterioration. Deterioration in cured stocks of rubber may vary with the type of stock, the state of cure and the amount of surface exposed. Also, the temperature of the oxidizable compositions is an important factor in deterioration. An ideal antioxidant would be one which would protect the oxidizable compound from deterioration regardless of use. Since no such general antioxidant has been discovered, compromises must be made in the selection of an antioxidant for a particular use.

It is an object of this invention to provide a non-discoloring antioxidant for oxidizable compositions such as rubbers, gasolines, oils, etc. It is another object of this invention to provide particular alkylated high-boiling phenols which are capable of protecting oxidizable compositions from deterioration due to oxygen, ozone, and/or sunlight, etc. It is still another object of this invention to provide a process for preparing particular alkylated high-boiling phenols which are capable of protecting various oxidizable compositions from deterioration due to oxygen, ozone, and/or sunlight, etc.

In the practice of this invention, mixtures of alkylated high-boiling phenols are reacted with aldehydes. These reaction products may be further described as the reaction products of a mixture of high-boiling phenols which boil at a temperature between 230° C. and 270° C. and an aldehyde containing from 1 to 8 carbon atoms.

More particularly, the compositions of this invention can be described as the reaction products of a mixture of phenols which boil at a temperature between 230° C. and 270° C. conforming to the following formula:

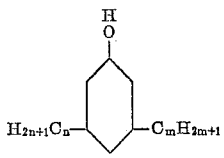

wherein $m$ and $n$ are integers ranging from 1 to 4 and wherein the sum of $m$ and $n$ is an integer ranging from 3 to 5, and an aldehyde having from 1 to 8 carbon atoms.

The high-boiling phenols of this invention may be described as a mixture of alkyl substituted phenols having a boiling range of 230° C. to 270° C. The principal constituents of these high-boiling phenols are compounds with two alkyl chains comprised of three or more carbon atoms, the alkyl chains usually being attached to the phenolic nucleus in the positions meta to the hydroxyl radical. These high-boiling phenols are transparent liquids which have a total phenolic content in excess of 97% by weight, have a hydrocarbon impurity content of less than 3%, and a water content less than 1% by weight. These high-boiling phenols contain no phenol or cresols, and contain only a negligible amount of xylenols. The high-boiling phenols of this invention are further described in Advanced Technical Information Bulletins Nos. F–8103 and F–8103B, published by Carbide and Carbon Chemicals Co. These compounds are particularly desirable as phenolic reactants because they display a high degree of trifunctionality wherein the ortho and para positions are available for substitution by means of olefins.

The high-boiling phenols of this invention contain approximately 15% by weight of indanol-4, 15% by weight of indanol-5, 10% by weight of 3-methyl-5-ethyl phenol and about 60% by weight of other meta phenols.

The high-boiling phenols of this invention may be partially alkylated by reaction with an olefin prior to being reacted with an aldehyde or the high-boiling phenol-aldehyde reaction products may be further alkylated by means of a customary alkylating agent such as an olefin.

The olefins which are useful as alkylating agents are selected from the alkenes, the cycloalkenes, and the arylalkenes.

The alkenes which are useful in the practice of this invention are alkenes which customarily contain from 4 to 9 carbon atoms such as isobutylene, tertiary pentenes, tertiary hexenes, tertiary heptenes, tertiary octenes, and tertiary nonenes. The cycloalkenes which are useful in the practice of this invention are cycloalkenes which may contain from 6 to 9 carbon atoms such as cyclopentene, methyl cyclohexenes, cyclohexenes, cyclooctenes, cyclononenes, etc. The arylalkenes which are useful in the practice of this invention are the arylalkenes which may contain from 7 to 12 carbon atoms such as sytrene, vinyl toluene, 1-methyl styrene, divinyl benzene, vinyl ethyl benzene, vinyl propyl benzene, vinyl isopropyl benzene, vinyl butyl benzene, etc.

The aldehydes which may be used to link the phenolic molecules together can be described as aldehydes which contain from 1 to 8 carbon atoms, e.g., formaldehyde, paraformaldehyde, acetaldehyde, butyraldehyde, isobutyraldehyde, pentaldehyde, hexaldehyde, heptaldehyde, 2-ethyl hexaldehyde, and the various branched chain aldehydes similar to the above.

The proportion of high-boiling phenols to aldehydes will vary. Customarily, one molecular equivalent will be required to react with two molecular equivalents of the mixtures of phenols. A slight excess of aldehyde is desirable in order to insure complete reaction. The proportion of olefin which may be used to further alkylate the phenolic compositions of this invention will vary according to the degree of alkylating desired and the available ortho and para positions. When the high-boiling phenols are partially alkylated prior to being reacted with an aldehyde, the proportion of alkylating agent must be controlled in order that substantially all of the molecules of phenol will have at least one ortho or para position available for further reaction with the aldehyde. When the high-boiling phenolaldehyde reaction products are further alkylated with one of the alkylating agents, a molar excess of the olefin may be used and is even desirable to insure that all of the positions ortho and para to the hydroxyl radicals of the high-boiling phenols are filled with an alkyl radical.

In the preparation of the alkylated high-boiling phenols, one or more of the customary acidic alkylation catalysts is used to activate and accelerate the reactions. For example, sulfuric acid, benzene sulfonic acid, toluene sulfonic acid, activated clays, stannic chloride, ferrous chloride, boron trifluoride, zinc chloride, ferric chloride, the ferrous and ferric halides, the stannous and stannic halides, aluminum halide and aluminum oxide will activate the reactions. Usually, concentrated sulfuric acid is used as the alkylation catalyst. The catalyst will ordinarily be used in an amount of at least 0.5% of the total weight of reactants in order to obtain proper action. Larger amounts of the catalyst, for example, up to 5.0% by weight of the reactants is satisfactory.

The temperature maintained during the reactions will normally be at least 50° C. but not over 150° C. If the alkylation temperature goes too high, the catalyst may become a catalyst for dealkylation. Although the temperature is not critical, the customary alkylation temperature of about 100° C. or less is normally used.

The practice of this invention is further illustrated by the following examples which are not intended as limitations on the scope of the invention.

EXAMPLE 1

Fifteen grams of formaldehyde were slowly added to 150 grams of high-boiling phenols which boil at a temperature between 230° C. and 270° C. in the presence of 5 mls. of concentrated hydrochloric acid. The mixture of high-boiling phenols was comprised of about 15% by weight of indanol-4, 15% by weight of indanol-5, 10% by weight of 3-methyl-5-ethyl phenol and about 60% by weight of meta phenols selected from diethyl phenol, methyl propyl phenol, methyl butyl phenol and ethyl propyl phenol. The temperature was maintained at about 80 to 120° C. for a period of two hours after which the water of reaction was removed giving a quantative yield of resin, determined by weighing the reaction products after heating to 200° C. at 20 mm. pressure to remove unreacted materials.

EXAMPLE 2

One hundred three grams of the high-boiling phenols described in Example 1 which had been butylated by means of one molecular equivalent of isobutylene were reacted with 15 grams of paraformaldehyde in the presence of 3.0 grams of concentrated hydrochloric acid. The temperature was maintained between 75° C. and 100° C. for a period of two hours after which the temperature was raised to 140° C. in order to remove the volatile materials. This gave a quantative yield of resin having a melting point of 90–107° C.

EXAMPLE 3

The mono-butylated high-boiling phenols described in Example 2 were reacted with 7.5 grams of paraformaldehyde according to the procedure described in Example 2. This reaction gave a quantative yield of resin having a melting point of 35–55° C.

The products of the invention were tested in the following standard rubber formulation:

| | |
|---|---|
| Extracted pale crepe | 100 |
| ZnO | 5 |
| Sulfur | 3 |
| Hexa | 1 |
| Stearic acid | 1.5 |
| Antioxidant | 1 |

Antioxidant efficiency was measured by aging samples, which were cured at 285° F. for 50 minutes, for 18 days in a standard oxygen bomb at 50° C. and 150 pounds per square inch pressure. The percent tensile retention and weight increase were used as measures of efficiency.

Table 1

[Oxygen bomb—18 days' aging]

| Description | Percent Tensile Retention | | | Percent Wt. Increase |
|---|---|---|---|---|
| | OT | FT | Percent TR | |
| R.P. isobutylene, H.B.P.[1] and HCHO (1:1:0.5) | 1,850 | 2,000 | 108.1 | −0.012 |
| Same as above (1:1:1) | 1,800 | 2,050 | 113.9 | 0.16 |
| R.P. H.B.P.[1] and HCHO (2:1) | 1,800 | 1,900 | 105.0 | 0.063 |
| R.P. of Distilled Mono-butyl H.B.P.[1] and HCHO (2:1) | 1,750 | 2,000 | 114.3 | 0.13 |
| Antioxidant A [2] | 2,250 | 1,150 | 51.1 | 0.90 |

[1] H.B.P. refers to high-boiling phenols as described in Example 1.
[2] A commercial mixture of alkylated phenols.

The rubbers which can be protected by the products of this invention are oxidizable, rubbery polymers of conjugated dienes which include natural rubber and the various synthetic diene rubbers which are similar to natural rubber in their aging characteristics, such as polychloroprene; butyl rubber, which is a polymerization product of a major proportion of a mono olefin, such as isobutylene, and a minor proportion of a multi-olefin, such as butadiene or isoprene; the rubbery copolymers of butadiene and styrene which may contain from 50 to 75% by weight of butadiene; the rubbery copolymers of butadiene and acrylonitrile; and polyisoprene.

The products of the invention are useful as age resistors for raw rubber in latex form, coagulated rubber latices or vulcanized rubber and may be present in an amount of from .25 to 5% by weight, based on the weight of rubber, although it is generally preferred to use from 0.5 to 2% by weight, based on the weight of the rubber.

The antioxidants of this invention can be incorporated into rubber in any customary manner. They may be added in the form of physical mixtures or in the form of emulsions, using any of the known emulsifiers such as monovalent metal hydroxides, fatty acids, organic soaps, etc. They may be added to the rubber in the form of latex, or they may be milled into coagulated rubber in the usual manner. The compounds of this invention can be used to stabilize thermally and catalytically cracked gasolines and gasoline blends by adding about .0001% to 0.1% by weight of the antioxidant to the gasoline.

While certain representative embodiments and details have been shown for the purpose of illustrating the invention, it will be apparent to those skilled in this art that various changes and modifications may be made therein without departing from the spirit or scope of the invention.

I claim:

1. An oxidizable rubbery polymer of a conjugated diene containing as an antioxidant from 0.25 to 5.0% by weight, based on the weight of the rubber, of a reaction product formed by reacting in the presence of an acidic catalyst (1) a mixture of phenols which boil at a temperature between 230° C. and 270° C. conforming to the following structure

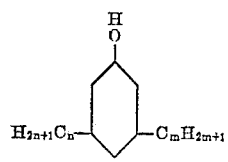

wherein $m$ and $n$ are integers ranging from 1 to 4 and wherein the sum of $m$ and $n$ is an integer ranging from 3 to 5, and (2) an aldehyde containing from 1 to 8 carbon atoms selected from the group consisting of formaldehyde, paraformaldehyde, acetaldehyde, butyraldehyde, isobutyraldehyde, pentaldehyde, hexaldehyde, heptaldehyde, and 2-ethyl hexaldehyde.

2. An oxidizable rubbery polymer of a conjugated diene containing as an antioxidant from 0.25 to 5.0% by weight, based on the weight of the rubber, of a reaction product formed by reacting in the presence of an acidic catalyst (1) a mixture of phenols which boil at a temperature between 230° C. and 270° C. conforming to the following structure

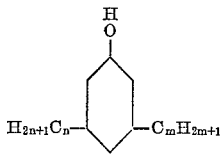

wherein $m$ and $n$ are integers ranging from 1 to 4 and wherein the sum of $m$ and $n$ is an integer ranging from 3 to 5, (2) an alkylating agent selected from the group consisting of alkenes having from 4 to 9 carbon atoms, cycloalkenes having from 6 to 9 carbon atoms, and arylalkenes having from 7 to 12 carbon atoms, and (3) an aldehyde containing from 1 to 8 carbon atoms selected from the group consisting of formaldehyde, paraformaldehyde, acetaldehyde, butyraldehyde, isobutyraldehyde, pentaldehyde, hexaldehyde, heptaldehyde, and 2-ethyl hexaldehyde.

3. The composition of claim 2 in which the aldehyde used to prepare the reaction product is formaldehyde.

4. An oxidizable rubbery polymer of a conjugated diene containing as an antioxidant from 0.25 to 5.0% by weight, based on the weight of the rubber, of a reaction product formed by reacting in the presence of hydrochloric acid (1) a mixture of phenols which boil at a temperature between 230° C. and 270° C. conforming to the following structure

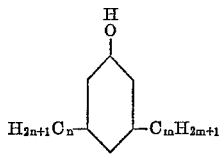

wherein $m$ and $n$ are integers ranging from 1 to 4 and wherein the sum of $m$ and $n$ is an integer ranging from 3 to 5, and (2) an aldehyde containing from 1 to 8 carbon atoms selected from the group consisting of formaldehyde, paraformaldehyde, acetaldehyde, butyraldehyde, isobutyraldehyde, pentaldehyde, hexaldehyde, heptaldehyde, and 2-ethyl hexaldehyde.

References Cited in the file of this patent

UNITED STATES PATENTS

| | | |
|---|---|---|
| 2,755,272 | Lambert et al. | July 17, 1956 |
| 2,789,108 | Mills et al. | Apr. 16, 1957 |
| 2,807,653 | Filbey et al. | Sept. 24, 1957 |
| 2,829,175 | Bowman et al. | Apr. 1, 1958 |
| 2,877,209 | Jansen et al. | Mar. 10, 1959 |
| 2,898,322 | Shepard | Aug. 4, 1959 |

FOREIGN PATENTS

| | | |
|---|---|---|
| 532,102 | Canada | Oct. 23, 1956 |